(12) United States Patent
Ishikawa (10) Patent No.: US 10,174,825 B2
(45) Date of Patent: Jan. 8, 2019

(54) PASSING-TYPE-MESHING NEGATIVE-DEFLECTION STRAIN WAVE GEARING

(71) Applicant: Harmonic Drive Systems Inc., Tokyo (JP)

(72) Inventor: Shoichi Ishikawa, Yokohama (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 298 days.

(21) Appl. No.: 15/102,409

(22) PCT Filed: Dec. 9, 2014

(86) PCT No.: PCT/JP2014/082589
§ 371 (c)(1),
(2) Date: Jun. 7, 2016

(87) PCT Pub. No.: WO2016/092636
PCT Pub. Date: Jun. 16, 2016

(65) Prior Publication Data
US 2016/0356373 A1 Dec. 8, 2016

(51) Int. Cl.
*F16H 49/00* (2006.01)
(52) U.S. Cl.
CPC ..... *F16H 49/001* (2013.01); *F16H 2049/003* (2013.01)
(58) Field of Classification Search
CPC .................................................... F16H 49/001
(Continued)

(56) References Cited

U.S. PATENT DOCUMENTS

| 2,906,143 A | 9/1959 | Walton |
| 4,823,638 A | 4/1989 | Ishikawa |

(Continued)

FOREIGN PATENT DOCUMENTS

| DE | 102009000648 A1 | 8/2010 |
| JP | 63-115943 A | 5/1988 |

(Continued)

OTHER PUBLICATIONS

International Search Report (PCT/ISA/210) dated Jan. 13, 2015, by the Japanese Patent Office as the International Searching Authority for International Application No. PCT/JP2014/082589 (two pages).

(Continued)

*Primary Examiner* — Ha Dinh Ho
(74) *Attorney, Agent, or Firm* — Buchanan Ingersoll & Rooney PC (57) ABSTRACT

A strain wave gearing is a negative deflection strain wave gearing. The tooth profile shape for the internally toothed gear is defined by using a convex, basic tooth profile curve, which is a curve portion from an inflection point (A) to a bottom-part point (B) of a moving locus (Mc) of an externally toothed gear with regard to an internally toothed gear obtained by a rack meshing approximation. The tooth profile shape for the externally toothed gear at a principal cross section is defined by a concave, basic tooth profile curve, which is generated in the externally toothed gear by the convex, basic tooth profile curve of the internally toothed gear moving from an apex (C) to an inflection point (A) of the moving locus (Mc). Passing-type meshing that is effective in lubrication is established, and bending stress in the tooth-bottom rim of the externally toothed gear can be reduced.

4 Claims, 8 Drawing Sheets

(58) Field of Classification Search
USPC .......................................................... 74/640
See application file for complete search history.

(56) References Cited

U.S. PATENT DOCUMENTS

| | | | | |
|---|---|---|---|---|
| 5,458,023 | A | * | 10/1995 | Ishikawa ............. F16H 55/0833 74/640 |
| 5,662,008 | A | * | 9/1997 | Aubin .................... F16H 49/001 74/640 |
| 5,687,620 | A | | 11/1997 | Ishikawa |
| 5,782,143 | A | | 7/1998 | Ishikawa |
| 5,918,508 | A | * | 7/1999 | Ishikawa ............. F16H 55/0833 475/180 |
| 6,167,783 | B1 | * | 1/2001 | Ishikawa ............. F16H 55/0833 74/457 |
| 6,526,849 | B1 | | 3/2003 | Ishikawa |
| 7,735,396 | B2 | | 6/2010 | Ishikawa et al. |

FOREIGN PATENT DOCUMENTS

| | | |
|---|---|---|
| JP | 5-172195 A | 7/1993 |
| JP | 07-293643 A | 11/1995 |
| JP | 2001-146945 A | 5/2001 |
| WO | WO 1996/19683 A1 | 6/1996 |
| WO | WO 2005/124189 A1 | 12/2005 |

OTHER PUBLICATIONS

Written Opinion (PCT/ISA/237) dated Jan. 13, 2015, by the Japanese Patent Office as the International Searching Authority for International Application No. PCT/JP2014/082589 (three pages).

* cited by examiner

PASSING-TYPE-MESHING NEGATIVE-DEFLECTION STRAIN WAVE GEARING

TECHNICAL FIELD

The present invention relates to a negative-deflection strain wave gearing in which a flexible externally toothed gear is flexed by a flexing amount (negative deflection state) less than a standard flexing amount and caused to mesh with a rigid internally toothed gear. More specifically, the present invention relates to a passing-type-meshing negative-deflection strain wave gearing in which the tooth profiles of an externally toothed gear and an internally toothed gear are set so that passing-type meshing, which is advantageous in terms of lubrication, is established.

BACKGROUND ART

A strain wave gearing is provided with a rigid internally toothed gear, a flexible externally toothed gear, and a wave generator. The externally toothed gear is ellipsoidally flexed by the wave generator, and caused to mesh with the internally toothed gear in, for example, two locations. In this case, the externally toothed gear has 2n (n: positive integer) fewer teeth than the internally toothed gear. When the wave generator is caused to rotate, the position at which the two gears mesh moves in the circumferential direction. For every one rotation of the wave generator, relative rotation is produced at an amount of an angle corresponding to the difference in the number of teeth between the two gears. The strain wave gearing is generic as a gear drive.

The strain wave gearing was invented by C. W. Musser (U.S. Pat. No. 2,906,143), and since that time, a variety of inventions concerning strain wave gearings have been made by many researchers, including Musser and the present inventor. A variety of inventions particularly relating to the tooth profiles of strain wave gearings have also been proposed. Among these, the present inventor has proposed the invention of a tooth profile design method for deriving the addendum tooth profile of two gears in contact over a wide area by using a technique in which tooth meshing of the internally toothed gear and the externally toothed gear is approximated by a rack (JP-A 63-115943). The addendum tooth profile of the externally toothed gear and the internally toothed gear derived by this tooth profile design method is a tooth profile in which "countermovement-type meshing" (countermovement contact) is performed.

There is demand for further advancement in the performance of strain wave gearings. To respond to this demand, the strength and wear resistance of the strain wave gearing must be further enhanced. In particular, the wear resistance of the tooth surface must be improved. It is therefore effective to use, as the tooth profile of the internally toothed gear, a tooth profile in which passing-type meshing (passing contact) is performed. A tooth profile in which passing-type meshing is performed has excellent properties for maintaining a lubricating oil film between the tooth surfaces and is more capable of preventing or suppressing wear of the teeth surfaces due to the breakage of the oil film than a tooth profile in which countermovement meshing is performed.

The inventor of the present invention proposed a strain wave gearing provided with a tooth profile in which passing-type meshing is performed (JP-A 07-293643, WO 2005/124189). In this strain wave gearing, the number of teeth of the externally toothed gear is set to 2n fewer than the number of teeth of the internally toothed gear, the movement locus obtained by approximating, using rack meshing, the meshing of the teeth of the externally toothed gear with the teeth of the internally toothed gear is calculated, and a similarity curve obtained by similarity transformation of a part of the movement locus is used to set the tooth addendum profile of the two gears.

"Passing-type meshing" is defined as meshing such that, when considering a state in which the end points of the linear elements of the two tooth profiles come into contact with the contact points of the tooth profiles, the linear elements of the two tooth profiles are positioned on the same side relative to the contact point. "Countermovement-type meshing" is defined as meshing such that, when considering a state in which the end points of the linear elements of the two tooth profiles come into contact with the contact points of the tooth profiles, the linear elements of the tooth profiles are positioned on opposite sides, with the contact points sandwiched therebetween.

PRIOR ART DOCUMENTS

Patent Documents

Patent Document 1: U.S. Pat. No. 2,906,143
Patent Document 2: JP-A 63-115943
Patent Document 3: JP-A 07-293643
Patent Document 4: WO 2005/124189

SUMMARY OF THE INVENTION

Problems to be Solved by the Invention

In the past, nothing has been proposed concerning a tooth profile in which passing-type meshing capable of being employed in a generic strain wave gearing is performed. That is, nothing has been proposed concerning tooth profiles of an externally toothed gear and an internally toothed gear in which passing-type meshing is performed in a generic strain wave gearing in which the number of teeth of an externally toothed gear disposed inside an internally toothed gear is 2n fewer than that of the internally toothed gear.

However, an externally toothed gear of a strain wave gearing is rotated while portions thereof are repeatedly flexed in the radial direction by a wave gear device. Accordingly, reduction of root rim bending stress, which is generated along with the flexing, is effective in increasing service life and improving allowable transmission torque. It is therefore thought that root rim bending stress is reduced when the tooth profile of the externally toothed gear is a concave tooth profile. Moreover, in a cup- or top-hat-shaped externally toothed gear, it is preferable to achieve continuous meshing in the tooth trace direction in order to improve allowable transmission torque.

However, in generic strain wave gearings, nothing has been proposed for achieving approximately continuous meshing using an externally toothed gear provided with a concave tooth profile and achieving passing-type meshing, which is advantageous in terms of lubrication.

An object of the present invention is to provide a strain wave gearing with which it is possible to achieve a long service life and improve allowable transmission torque by employing, in the tooth profiles of an internally toothed gear and an externally toothed gear, a tooth profile in which passing-type meshing advantageous in terms of tooth surface lubrication is performed, and reducing the rim bending stress by using a concave tooth profile for the tooth profile of the externally toothed gear.

Means used to Solve the Problems

In order to solve the abovementioned problems, according to the present invention, there is provided a strain wave gearing having a rigid internally toothed gear, a flexible externally toothed gear disposed inside the internally toothed gear, and a wave generator disposed inside the externally toothed gear, the strain wave gearing characterized in that:

the externally toothed gear is ellipsoidally flexed by the wave generator, and external teeth of the ellipsoidally flexed externally toothed gear mesh with internal teeth of the internally toothed gear on both major-axis-direction ends of the externally toothed gear;

the internally toothed gear and the externally toothed gear prior to ellipsoidal deformation are both spur gears having module m, the number of teeth of the externally toothed gear is 2n fewer than the number of teeth of the internally toothed gear, where n is a positive integer;

the flexing amount relative to a rim-neutral circle prior to flexing is 2κmn, where κ is the deflection coefficient, at a position on the major axis of an ellipsoidal rim-neutral curve of the root rim of the externally toothed gear;

the external teeth have a negative deflection tooth profile in which the deflection coefficient κ satisfies 0<κ<1;

a movement locus of the external teeth relative to the internal teeth following the rotation of the wave generator is approximated by a movement locus obtained when meshing of the external teeth and the internal teeth is approximated by a rack;

the tooth profile shape of the internal teeth on an axis-perpendicular cross section is defined by a convex, basic tooth profile curve;

the convex, basic tooth profile curve is a curve having a range from the inflection point in the movement locus to the bottom part in the movement locus;

the tooth profile shape of the external teeth on an axis-perpendicular cross section is defined by a concave, basic tooth profile curve; and the concave, basic tooth profile curve is a generation curve, in which the tooth profile of the internal teeth defined by the convex, basic tooth profile curve generates in the external teeth by moving from the apex of the movement locus to the inflection point thereof.

In the strain wave gearing of the present invention, a tooth profile in which passing-type meshing, which is advantageous in terms of tooth surface lubrication, is performed is employed in tooth profiles of an internally toothed gear and an externally toothed gear. Moreover, a concave tooth profile is employed in the tooth profile of the externally toothed gear to reduce rim bending stress. According to the present invention, the strain wave gearing can attain a longer service life and improved allowable transmission torque.

MODE FOR CARRYING OUT THE INVENTION

A strain wave gearing employing the present invention will be described below with reference to the drawings.
(Configuration of Strain Wave Gearing)

Figure 1:
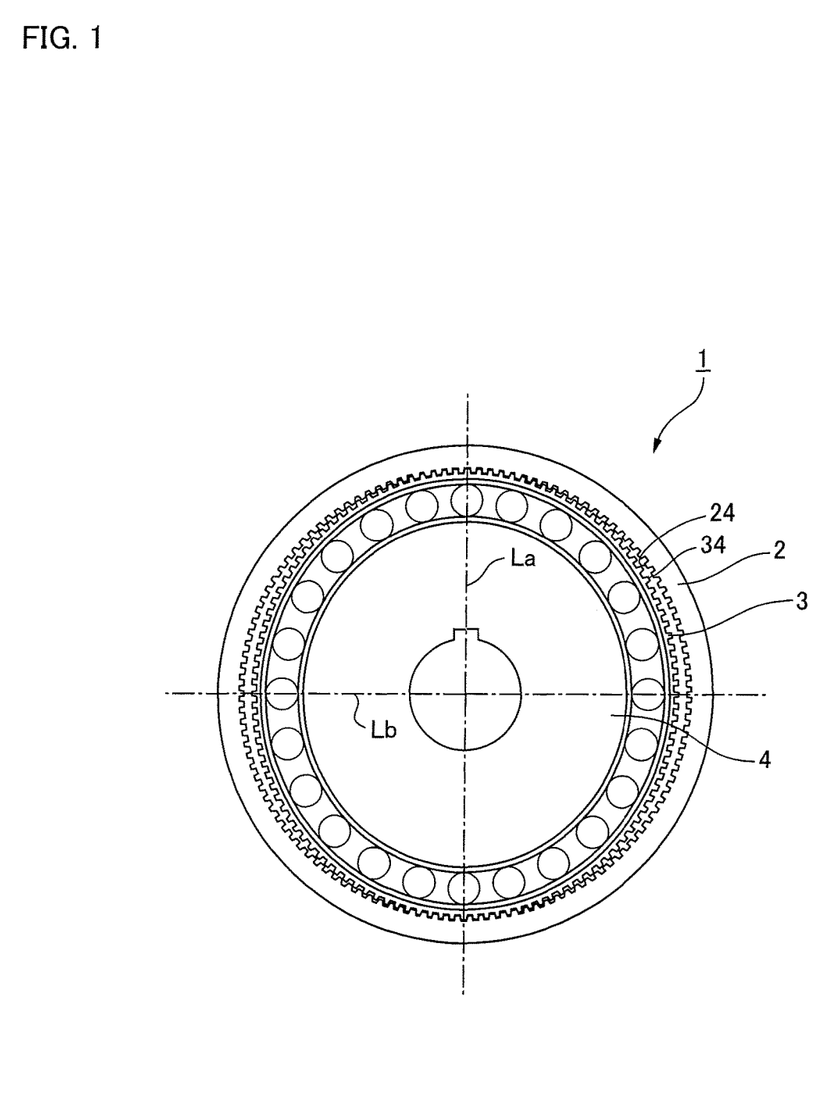
FIG. 1 is a schematic front view showing an example of a strain wave gearing employing the present invention.
Figure 2:
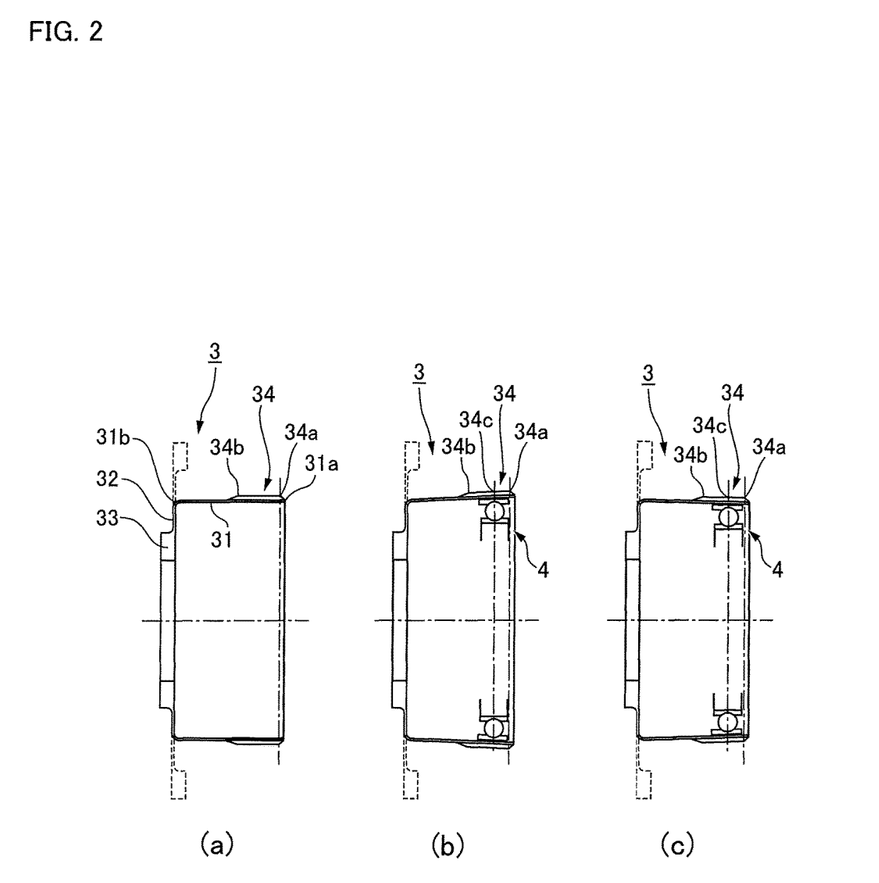
FIG. 2 is an explanatory view showing flexing conditions of a cup- or top-hat-shaped externally toothed gear in cross sections through axes, where (A) shows the state of a cross section prior to deformation, (B) shows the state of a cross section that includes the major axis of an ellipsoidally deformed externally toothed gear, and (C) shows the state of a cross section that includes the minor axis of an ellipsoidally deformed externally toothed gear.

FIG. 1 is a schematic front view of a strain wave gearing capable of employing the present invention, and FIG. 2 is a cross-sectional view showing conditions in which an externally toothed gear thereof is subjected to ellipsoidal flexing in a cross section through an axis, where (A) shows a cross section of an externally toothed gear in the state of a perfect circle prior to deformation, (B) shows a cross section including the major axis of an externally toothed gear after ellipsoidal flexing, and (C) shows a cross section including the minor axis in an externally toothed gear after ellipsoidal flexing. The solid lines in FIG. 2 show a portion of a diaphragm and a boss in a cup-shaped externally toothed gear, and the dotted lines show a portion of a diaphragm and a boss in a top-hat-shaped externally toothed gear.

A strain wave gearing 1 has an annular, rigid internally toothed gear 2, a flexible externally toothed gear 3 disposed inside the gear 2, and an ellipsoidally contoured wave generator 4 fitted inside the gear 3, as shown in the drawings. The internally toothed gear 2 and the pre-deformation externally toothed gear 3 are spur gears having module m. The difference in the number of teeth between the internally toothed gear 2 and the externally toothed gear 3 is 2n (n: positive integer). The externally toothed gear 3 is subjected to ellipsoidal flexing by the wave generator 4, and external teeth 34 are meshed with internal teeth 24 of the internally toothed gear 2 at both end portions of the ellipsoidal shape in the direction of a major axis La. The meshing position of the two gears 2, 3 moves in a circumferential direction when the wave generator 4 is rotated, and relative rotation that corresponds to the difference in the number of teeth of the two gears is generated between the two gears 2, 3.

The externally toothed gear 3 is provided with a flexible cylindrical barrel part 31 capable of flexing in the radial direction, a radially widening diaphragm 32 continuous with a back end 31*b* of the cylindrical barrel part 31, a boss 33 continuous with the diaphragm 32, and external teeth 34 formed in the portion of the outer cylindrical surface of the cylindrical barrel part 31 on the side near an opening end 31*a*, as seen in FIG. 2(*a*). The amount of flexing of the cylindrical barrel part 31 to the outside or inside in the radial direction is gradually increased from the back end 31*b* on the diaphragm side of the cylindrical barrel part 31 toward the opening end 31*a* by the ellipsoidally contoured wave generator 4 fitted in the portion on the inner circumferential surface of the section of the cylindrical barrel part 31 in which the external teeth are formed.

The amount of flexing to the outside is gradually increased in proportion to the distance from the back end 31*b* to the opening end 31*a* in the cross section that includes the major axis La of the ellipsoidal shape (see FIG. 1), as shown in FIG. 2(*b*). Conversely, the amount of flexing to the inside is gradually increased in proportion to the distance from the back end 31*b* to the opening end 31*a* in the cross section that includes a minor axis Lb (see FIG. 1), as shown in FIG. 2(*c*). Accordingly, for the external teeth 34 formed in the portion of the outer circumferential surface on the side near the opening end 31*a* as well, the amount of flexing is gradually increased from an inside end part 34*b* of the external teeth 34 in the tooth trace direction toward an opening end part 34*a* in proportion to the distance from the back end 31*b* of the cylindrical barrel part 31.

A circle passing through the thickness-direction center of a root rim of the external teeth 34 prior to ellipsoidal flexing is a rim-neutral circle in an axis-perpendicular cross section that is selected at a given position of the external teeth 34 in the tooth trace direction. In contrast, an ellipsoidal curve passing through the thickness-direction center of a root rim after ellipsoidal flexing is referred to as a "rim-neutral curve." The amount of flexing w in the major axis direction with respect to the rim-neutral circle at a position on the major axis of the ellipsoidal rim-neutral curve is 2κmn, where κ (a real number that includes 1) is a deflection coefficient. The external teeth 34 of the externally toothed gear 3 of the present invention have a negative deflection tooth profile, and the deflection coefficient κ of the opening end part 34*a* of the external teeth 34 is set to 0<κ<1.

In other words, the standard (reference) flexing amount wo in the major axis direction is a value (m$Z_F$/R=2mn) obtained by dividing the pitch diameter m$Z_F$ of the externally toothed gear 3 by the reduction ratio R (=$Z_F$/($Z_C$−$Z_F$)=$Z_F$/2n) of the strain wave gearing 1, where $Z_F$ is the number of external teeth 34 of the externally toothed gear 3, and $Z_C$ is the number of internal teeth 24 of the internally toothed gear 2. The strain wave gearing 1 is generally designed so as to be flexed by the standard flexing amount wo (=2mn) in a region in the tooth trace direction of the externally toothed gear 3 where the center of a ball in a wave bearing of the wave generator 4 is positioned. The deflection coefficient κ is a value obtained by dividing the flexing amount w in axis-perpendicular cross sections of the externally toothed gear 3 in the tooth trace direction by the standard flexing amount. Accordingly, the deflection coefficient in the external teeth 34 at a position where the standard flexing amount wo is obtained is κ=1, the flexing coefficient at a position in a cross section having a flexing amount w less than the standard flexing amount wo is κ<1, and the flexing coefficient at a position in a cross section having a flexing amount w greater than the standard flexing amount wo is κ>1. A tooth profile in the external teeth 34 in which the standard flexing amount wo (κ=1) is obtained is referred to as a "reference deflection tooth profile," a tooth profile in which a flexing amount smaller than the standard flexing amount (κ<1) is obtained is referred to as a "negative deflection tooth profile," and a tooth profile in which a flexing amount greater than the standard flexing amount (κ>1) is obtained is referred to as a "positive deflection tooth profile." The external teeth 34 of the flexible externally toothed gear 3 of the present invention are set as having a negative deflection tooth profile.

Figure 3A:
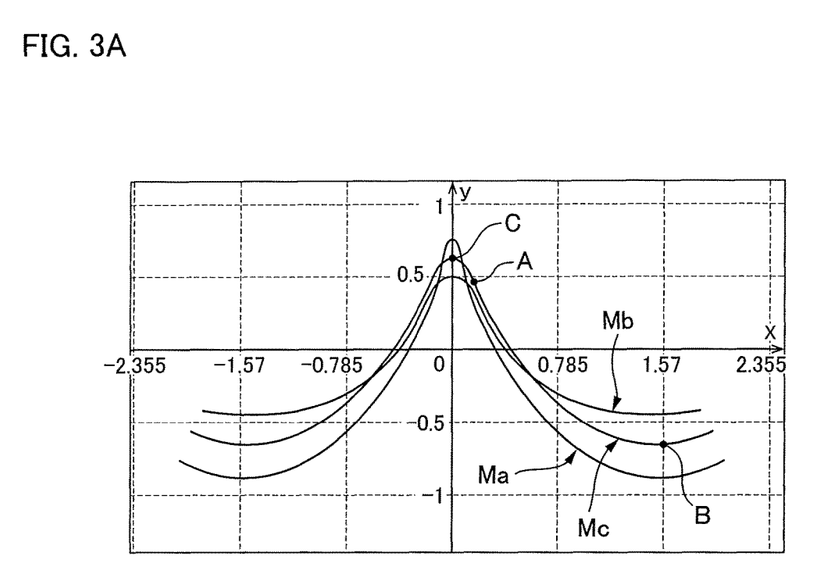
FIG. 3A is a graph showing movement loci of external teeth, where the movement loci are obtained when the relative motion of the two gears at each position of an inside end part, a principal cross section, and an opening end part of the external teeth in the tooth trace direction is approximated by a rack.

FIG. 3A is a view showing movement loci of the external teeth 34 of the flexible externally toothed gear 3 relative to the internal teeth 24 of the rigid internally toothed gear 2, where the movement loci are obtained when the relative motion of the two gears 2, 3 of the strain wave gearing 1 is approximated by a rack. In FIG. 3A, the x-axis is the translation direction of the rack, and the y-axis is the direction perpendicular thereto. The origin of the y-axis is the average position of amplitude in the movement loci. The curve Ma is a movement locus obtained at the opening end part 34*a* of the external teeth 34, and the curve Mb is a movement locus obtained at the inside end part 34*b*. The curve Mc is a movement locus obtained at a center part 34*c* (hereinafter referred to as "principal cross section 34*c*") in the tooth trace direction in the present example at a given position between the opening end part 34*a* and the inside end part 34*b* in the tooth trace direction. The movement loci of the external teeth 34 of the externally toothed gear 3 relative to the internal teeth 24 of the internally toothed gear 2 are expressed by the following equations. θ is a parameter.

$x = 0.5mn(\theta - \kappa \sin \theta)$ $y = \kappa mn \cos \theta$

In order to simplify the description, when module m=1 and n=1 (difference in number of teeth 2n=2), the previous equations are expressed by the following equations.

$x = 0.5(\theta - \kappa \sin \theta)$ $y = \kappa \cos \theta$

In the external teeth 34 of the externally toothed gear 3 of the present example, the flexing amount at each position in the tooth trace direction changes approximately in proportion to the distance from the diaphragm side (the deflection coefficient κ changes approximately in proportion to the distance from the diaphragm side). When the tooth profile of the external teeth 34 is set at a position in the principal cross section 34*c* of the external teeth 34, clearance with the tooth top of the internal teeth 24 cannot be ensured and interference with the internal teeth 24 occurs at a position in each axis-perpendicular cross section in the tooth trace direction other than a position on the principal cross section 34*c*, and an appropriate meshing state of the two tooth profiles therefore cannot be ensured. Accordingly, the tooth profile of the external teeth 34 is shifted, a shift occurs in the tooth depth direction from the principal cross section 34*c* to the opening end part 34*a*, and a shift occurs in the tooth depth direction from the principal cross section 34*c* to the inside end part 34*b*.

Here, $\kappa_m$ is the deflection coefficient of the principal cross section 34*c*. When mnh is the shift amount at a position in each axis-perpendicular cross section of the external teeth 34 in the tooth trace direction, h is the shift amount when m=1 and n=1. In this case, movement loci caused by rack approximation in which the external teeth 34 are drawn relative to the internal teeth 24 are expressed by equation (1).

$$x=0.5(\theta-\kappa \sin \theta)$$

$$y=\kappa \cos \theta + h \quad (0 \leq \theta \leq \pi) \tag{1}$$

$$h=-|\kappa_m-\kappa|$$

Figure 3B:
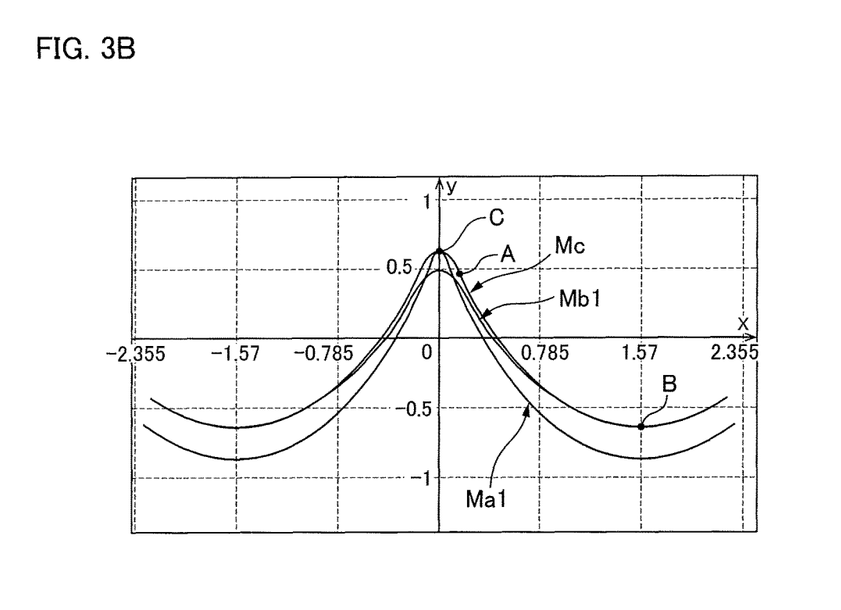
FIG. 3B is a graph showing movement loci of shifted external teeth, where the movement loci are obtained when the relative motion of the two gears at each position of an inside end part, a principal cross section, and an opening end part of the external teeth in the tooth trace direction are approximated by a rack.

By performing an appropriate amount of shift in regions other than the principal cross section 34c in the external teeth 34, the movement locus Ma at the opening end part 34a and the movement locus Mb at the inside end part 34b shown in FIG. 3A change to a movement locus Ma1 and a movement locus Mb1, respectively, shown in FIG. 3B.

FIG. 3B is a graph showing the movement locus Mc obtained in the principal cross section 34c, and movement loci Ma1, Mb1 obtained in the opening end part 34a and the inside end part 34b after a shift. The apex of the movement loci at each position of the external teeth 34 from the principal cross section 34c to the opening end part 34a coincides with an apex C of the movement locus Mc at the principal cross section 34c, as seen in FIG. 3B. Moreover, the bottom part of the movement loci at each position of the external teeth 34 from the principal cross section 34c to the inside end part 34b coincides with a point B of the bottom part of the movement locus Mc at the principal cross section 34c.

Thus, the tooth profile of the external teeth 34, other than that of the principal cross section 34c thereof, is a shifted tooth profile in which a shift has been performed by the shift amount h, given in the third equation of equation (1), relative to the tooth profile of the principal cross section 34c set as described in the following.

(Formation Method of Tooth Profile in Internal Teeth and Tooth Profile in External Teeth in Principal Cross Section)

Figure 4:
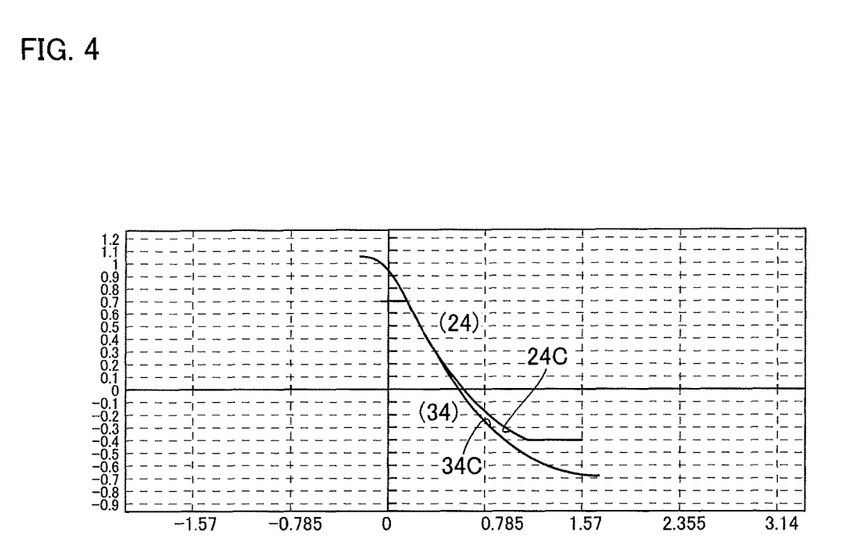
FIG. 4 is a curve defining a basic tooth profile for each of the internal and external teeth, the curve being derived from a movement locus in the principal cross section of the external teeth.

The formation method of a tooth profile of the internal teeth 24 and the formation method of the tooth profile of the principal cross section of the external teeth 34 will be described with reference to FIGS. 3B and 4. FIG. 4 is an explanatory view showing an example of a tooth profile curve 24C of the internal teeth 24 and a tooth profile curve 34C of the external teeth 34 in the principal cross section, the tooth profile curves being set as described in the following.

In the present invention, the movement locus Mc obtained in the principal cross section 34c of the externally toothed gear 3 is used in order to define the tooth profile of the internal teeth 24. First, a curve AB is adopted for the $\theta_A$ to n range of the parameter in the movement locus Mc of the principal cross section 34c shown in FIG. 3B. The position where the parameter θ equals $\theta_A$ is a point A, which is the inflection point of the movement locus Mc, and the position where the parameter θ equals n is the point B on the bottom part of the movement locus Mc. The curve AB is employed as a convex, basic tooth profile curve of the internal teeth 24.

In other words, the main part of a common tooth profile (axis-perpendicular cross section) in the entire tooth trace of the internal teeth 24 is given by the following equation, where h=0 and the range of the parameter θ is $\theta_A$ (value of θ yielding the inflection point A) to where θ=Π(point B) in equation (1).

$$x=0.5(\theta-\kappa_m \sin \theta)$$

$$y=\kappa_m \cos \theta \quad (\theta_A \leq \theta \leq \pi) \tag{2}$$

The tooth profile of the internal teeth 24 has a shape in which appropriate tooth profile correction has been performed on a tooth profile defined by the convex, basic tooth profile curve 24C at a portion defining the tooth top in order to ensure clearance with the opposing tooth profile, as shown in FIG. 4.

Here, in the movement locus Mc, the angle of inclination α of a tangent to the movement locus Mc relative to the vertical y-axis is given by the following equation derived from equation (2).

$$\tan\alpha = \frac{0.5(1-\kappa_m\cos\theta)}{\kappa_m\sin\theta} \tag{3}$$

Using equation (3), the angle of inclination $\alpha_A$ at the inflection point A of the movement locus Mc is given by the following equation.

$$\tan\alpha_A = \frac{0.5(1-\kappa_m\cos\theta_A)}{\kappa_m\sin\theta_A} \tag{4}$$

By contrast, the basic tooth profile curve of the external teeth 34 in the principal cross section 34c is a concave curve generated by the convex tooth profile of the internal teeth 24 while moving from the apex C to the inflection point A of the movement locus Mc of the external teeth, as given in equation (1). The concave, basic tooth profile curve can be calculated from equation (1) as follows because the angle of inclination between the apex C and the inflection point A of the movement locus Mc is equated with the angle of inclination of the internal teeth 24.

$$x(\theta) = 0.5(\theta - \kappa_m\sin\theta) - 0.5(\theta_D - \kappa_m\sin\theta_D) \tag{5}$$

$$y(\theta) = \kappa_m(\kappa_m + 1 + \cos\theta - \cos\theta_A - \cos\theta_D) \quad (\theta_A \leq \theta \leq \pi)$$

$$\theta_D = \sin^{-1}\frac{\tan\alpha - \sqrt{0.25(\kappa_m^2-1)+(\kappa_m\tan\alpha)^2}}{2\kappa_m(0.25+\tan^2\alpha)} \quad (\alpha_A \leq \alpha \leq \pi/2)$$

The third equation above was obtained by solving equation (3) for θ.

As shown in FIG. 4, the tooth profile of the external teeth 34 has a shape in which appropriate correction has been performed on a tooth profile defined by the concave, basic tooth profile curve 34C at the tooth top portion thereof in order to ensure clearance with the opposing tooth profile.

(Tooth Profile of Axis-Perpendicular Cross Sections of External Teeth, Excluding Principal Cross Section Thereof)

The previous description relates to a formation method of a tooth profile in the principal cross section 34c of the externally toothed gear 3. A tooth profile of the external teeth 34 is set as follows for an axis-perpendicular cross section other than the principal cross section 34c in the external teeth 34 as well in order to maintain effective meshing with the internal teeth 24. Specifically, as described previously with reference to FIG. 3B and equation (1), shift is performed in the tooth profile of the externally toothed gear 3 by an amount corresponding to the value of the deflection coefficient κ from the principal cross section 34c to the opening end part 34a of the external teeth 34 and from the principal cross section 34c to the inside end part 34b.

The apex of the movement locus at each position of the external teeth 34 coincides with the apex of the movement locus Mc at the principal cross section 34c from the principal cross section 34c to the opening end part 34a. Moreover, the bottom part of the movement locus at each position of the external teeth 34 coincides with the bottom part of the movement locus Mc at the principal cross section 34c from the principal cross section 34c to the inside end part 34b. Therefore, the tooth profile in the externally toothed gear 3, other than the tooth profile of the principal cross section 34c thereof, is a shifted tooth profile shifted relative to the tooth profile of the principal cross section 34c by the shift amount h given in the third equation in equation (1).

Figure 5:
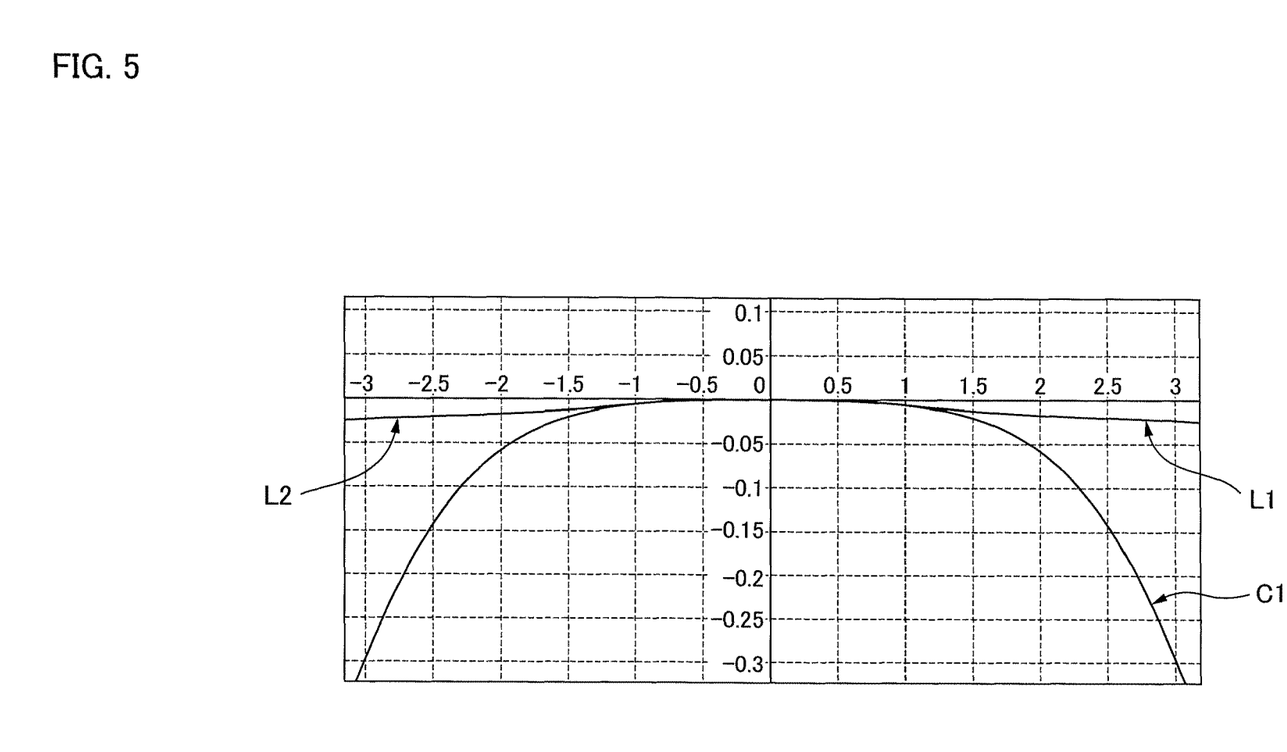
FIG. 5 is a graph showing the shape of the external teeth near the center of the tooth trace.

FIG. 5 is a graph showing an example of the shift amount near the center of the externally toothed gear 3 in the tooth trace direction. The horizontal axis in FIG. 5 shows the distance from the center (principal cross section) of the external teeth 34 in the tooth trace direction, and the vertical axis shows the shift amount h. The shift amount h is shown by shift straight lines L1, L2 having the same inclination. The shift straight line L1 shows the shift amount from the principal cross section to the opening end part 34a, and the shift straight line L2 shows the shift amount from the principal cross section to the opening end part 34b.

Moreover, FIG. 5 shows a quaternary curve C1 tangent to the shift straight lines L1, L2, where the origin is the principal cross section. When the shift amount at each position is calculated on the basis of the quaternary curve C1, a substantially flat part is formed on a center portion in the tooth trace direction of the external teeth 34, the center portion including the principal cross section. A smooth change in shift is thereby assured. Moreover, the flat part is used in dimensional control when cutting teeth of the externally toothed gear 3.

Figure 6:
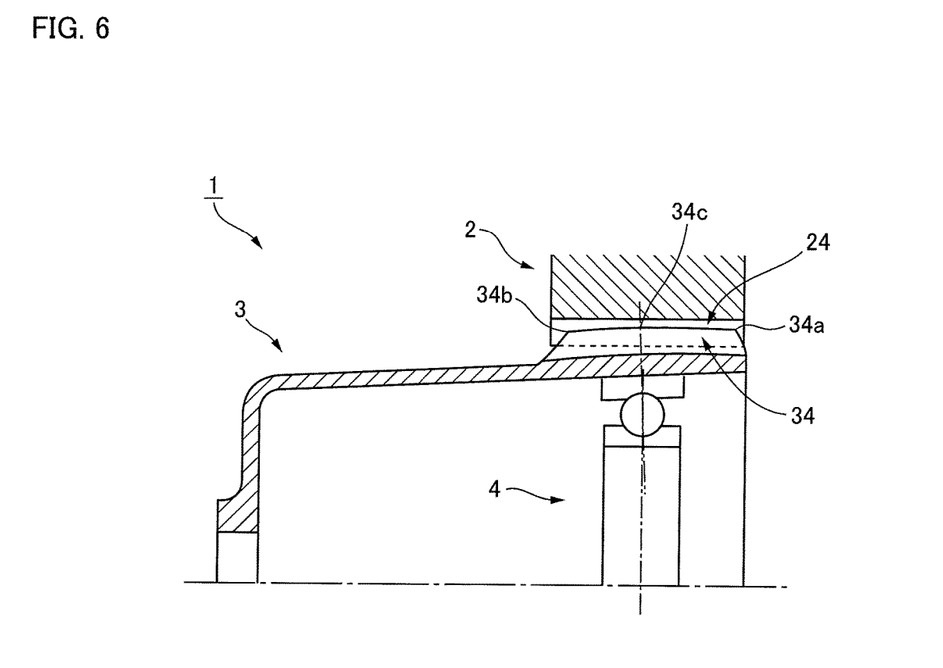
FIG. 6 is an explanatory view showing the contour shape of shifted external teeth in the tooth trace direction.

FIG. 6 is an explanatory view showing a tooth profile contour of the external teeth 34 and internal teeth 24 along the tooth trace direction. FIG. 6 shows a state (deepest meshing state) at a cross section that includes the major axis in a state where the external teeth and the internal teeth are meshing. The tooth-trace-direction tooth profile contour of the external teeth 34 is defined by: the quaternary curve C1 in the center portion in the tooth trace direction that includes the principal cross section 34c thereof; the shift straight line L1 in the portion in the area from the center portion to the opening end part 34a; and the shift straight line L2 in the portion in the area from the center portion to the inside end part 34b.

Figure 7:
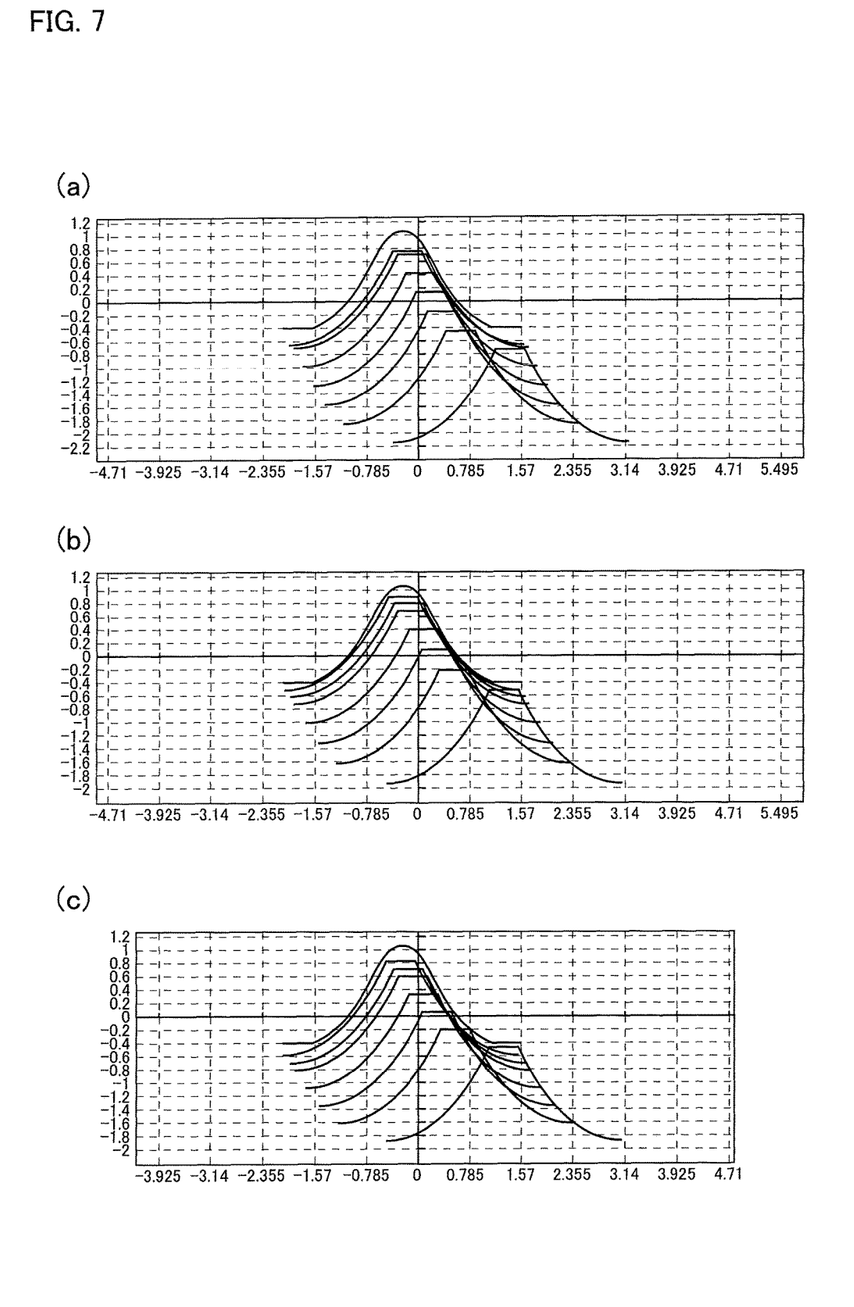
FIG. 7 is an explanatory view showing movement loci of the external teeth and rack-approximated meshing of the external teeth and the internal teeth, (A) shows movement loci and meshing in the opening end part of the external teeth, (B) shows movement loci and meshing in the center part (principal cross section) of the external teeth, and (C) shows movement loci and meshing in the inside end part of the external teeth.

FIGS. 7(a), 7(b), and 7(c) are explanatory views showing a meshing aspect, at rack approximation, of the external teeth 34 and the internal teeth 24 in which the tooth profile is set as described above. FIG. 7(a) is obtained at a position of the opening end part 34a of the external teeth 34, FIG. 7(b) is obtained at a position of the principal cross section 34c of the external teeth 34, and FIG. 7(c) is obtained at a position of the inside end part 34b of the external teeth 34. As understood from these drawings, the external teeth 34 of the externally toothed gear 3 are brought into contact with the internal teeth 24 while being approximated at every position from the opening end part 34a, through the principal cross section 34c, and to the inside end part 34b of the external teeth 34.

As described above, passing-type meshing, which has an advantage in terms of lubrication, can be realized in a main region that includes the principal cross section 34c in the tooth trace direction of the externally toothed gear 3 in the strain wave gearing 1. Accordingly, a strain wave gearing having a longer service life can be realized.

Moreover, the tooth profile of the externally toothed gear 3 is a concave tooth profile, and bending stress due to ellipsoidal deformation of the rim can be made less than when a convex tooth profile is employed, and transmission torque can be increased.

Furthermore, a shift in tooth profile of the externally toothed gear 3 is performed, and approximately continuous meshing is achieved between the internal teeth 24 and the external teeth 34 in the tooth trace center and the axis-perpendicular cross section in the vicinity thereof. A strain wave gearing having even more transmittable torque can thereby be realized.

(Other Embodiments)

In the above-described examples, the present invention is applied to a strain wave gearing provided with a cup- or top-hat-shaped externally toothed gear. A strain wave gearing referred to as a "flat-type strain wave gearing" provided with a cylindrical externally toothed gear is also known. In this case, the flexing amount of the externally toothed gear at each position in the tooth trace direction is identical (deflection coefficient κ is constant). Accordingly, in the case of an externally toothed gear of a flat-type strain wave gearing, the tooth profiles of the external teeth thereof are identically shaped in the tooth trace direction and are defined by a concave, basic tooth profile curve. Moreover, appropriate tooth profile correction is performed on the tooth profiles of both the internal teeth and the external teeth so as to ensure tooth-top clearance between them.

The invention claimed is:

1. A passing-type-meshing negative deflection strain wave gearing, comprising:
 a rigid internally toothed gear, a flexible externally toothed gear disposed inside the internally toothed gear, and a wave generator disposed inside the externally toothed gear, wherein
 the externally toothed gear is ellipsoidally flexed by the wave generator, and external teeth of the flexible externally toothed gear mesh with internal teeth of the internally toothed gear on both major-axis-direction ends of the externally toothed gear;
 the internally toothed gear and the externally toothed gear prior to ellipsoidal deformation are both spur gears having module m;
 a number of teeth of the externally toothed gear is 2n fewer than a number of teeth of the internally toothed gear, where n is a positive integer;
 a flexing amount relative to a rim-neutral circle prior to flexing is 2κmn, where κ is a deflection coefficient, at a position on a major axis of an ellipsoidal rim-neutral curve of a root rim of the externally toothed gear;
 the external teeth have a negative deflection tooth profile in which the deflection coefficient κ satisfies $0 < \kappa < 1$;
 an actual movement locus of the external teeth relative to the internal teeth following a rotation of the wave generator is approximated by a movement locus obtained when meshing of the external teeth and the internal teeth is approximated by a rack;
 a tooth profile shape of the internal teeth on an axis-perpendicular cross section is defined by a convex, basic tooth profile curve;
 the convex, basic tooth profile curve is a curve having a range from an inflection point in the movement locus to a bottom part in the movement locus;
 a tooth profile shape of the external teeth on an axis-perpendicular cross section is defined by a concave, basic tooth profile curve; and
 the concave, basic tooth profile curve is a generation curve, the generation curve being generated by moving the tooth profile of the internal teeth defined by the convex, basic tooth profile curve, from an apex of the movement locus to the inflection point thereof.

2. The passing-type-meshing negative-deflection strain wave gearing according to claim 1, wherein the externally toothed gear has a flexible cylindrical barrel part, a radially widening diaphragm continuous with a back end of the cylindrical barrel part, and external teeth formed in a portion of an outer cylindrical surface of the cylindrical barrel part on a side near an opening end of the cylindrical barrel part;

a flexing amount of the externally teeth is gradually increased from an external-tooth inside end on the diaphragm side toward an external-tooth opening end on the opening end side along a tooth trace direction of the external teeth;

a tooth profile of the external teeth in a principle cross section thereof is a concave, basic tooth profile curve defined by the generation curve, the principle cross section being an axis-perpendicular cross section that is selected at a given position of the external teeth in a tooth trace direction between the external-tooth opening end and the external-tooth inside end of the external teeth; and a tooth profile shape of the external teeth in the tooth trace direction for an axis-perpendicular cross section other than the principal cross section is a shifted tooth profile that is obtained by performing shift to the concave, basic tooth profile curve by an amount corresponding to the flexing amount, wherein the tooth profile shape of the external teeth at each position in the tooth trace direction from the principle cross section to the external-tooth opening end is obtained by performing shift so that the apex of the movement locus drawn by the concave, basic tooth profile at each position of the external teeth coincides with the apex of the movement locus at the principal cross section; and the tooth profile shape of the external teeth at each position in the tooth trace direction from the principle cross section to the external-tooth inside end is obtained by performing shift so that the bottom part of the movement locus drawn by the concave, basic tooth profile at each position of the external teeth coincides with the bottom part of the movement locus at the principle cross section.

3. The passing-type-meshing negative-deflection strain wave gearing according to claim 1, wherein tooth profile correction is performed on the internal teeth and the external teeth respectively in order to ensure a tooth-top clearance with an opposing tooth profile.

4. The passing-type-meshing negative-deflection strain wave gearing according to claim 2, wherein tooth profile correction is performed on the internal teeth and the external teeth respectively in order to ensure a tooth-top clearance with an opposing tooth profile.

\* \* \* \* \*